(12) United States Patent
Knoplioch et al.

(10) Patent No.: US 6,421,413 B1
(45) Date of Patent: Jul. 16, 2002

(54) METHODS AND APPARATUS FOR INTERACTIVELY DISPLAYING CURVED REFORMATION IMAGES

(75) Inventors: Jerome Knoplioch, Neuilly sur Seine; Gilles R. Moris, Boulogne-Billancourt; Fabienne Betting, Paris, all of (FR)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 09/722,947

(22) Filed: Nov. 27, 2000

(51) Int. Cl.[7] .................................................. A61B 6/03
(52) U.S. Cl. .............................. 378/19; 378/901; 378/4; 382/131; 600/425; 345/419
(58) Field of Search ................................ 378/4, 15, 19; 382/901, 128, 131; 600/407, 410, 425; 345/419, 420

(56) References Cited
U.S. PATENT DOCUMENTS 6,075,835 A * 6/2000 Acharya et al. ................ 378/4
6,272,366 B1 * 8/2000 Vining ........................ 600/407

* cited by examiner

Primary Examiner—Drew Dunn
(74) Attorney, Agent, or Firm—Carl B. Horton, Esq.; Armstrong Teasdale LLP

(57) ABSTRACT

One embodiment of the present invention is a method for interactively rotating a sampling surface of a reconstructed computed tomographic (CT) image. The method includes steps of: scanning a volume of a patient to collect a plurality of slices of image data; displaying an image slice including a structure of interest on a display; defining a segmented line approximating a centerline of the structure of interest; selecting a rotation vector, a reference vector, and an angle; generating a sampling vector as a function of the rotation vector, the reference vector, and the selected angle; and generating a curved reformation image from the plurality of slices of image data using the segmented line and the sampling vector.

20 Claims, 5 Drawing Sheets

METHODS AND APPARATUS FOR INTERACTIVELY DISPLAYING CURVED REFORMATION IMAGES

BACKGROUND OF THE INVENTION

This invention relates generally to methods and apparatus for interactive display of computed tomographic (CT) images, and more particularly to methods and apparatus for display of such images in a limited amount of time to perform full volumetric analysis in a user-friendly manner.

In at least some computed tomography (CT) imaging system configurations, an x-ray source projects a fan-shaped beam which is collimated to lie within an X-Y plane of a Cartesian coordinate system and generally referred to as the "imaging plane". The x-ray beam passes through the object being imaged, such as a patient. The beam, after being attenuated by the object, impinges upon an array of radiation detectors. The intensity of the attenuated beam radiation received at the detector array is dependent upon the attenuation of the x-ray beam by the object. Each detector element of the array produces a separate electrical signal that is a measurement of the beam attenuation at the detector location. The attenuation measurements from all the detectors are acquired separately to produce a transmission profile.

In known third generation CT systems, the x-ray source and the detector array are rotated with a gantry within the imaging plane and around the object to be imaged so that the angle at which the x-ray beam intersects the object constantly changes. X-ray sources typically include x-ray tubes, which emit the x-ray beam at a focal spot. X-ray detectors typically include a collimator for collimating x-ray beams received at the detector, a scintillator adjacent the collimator, and photodetectors adjacent the scintillator.

CT, MR and XR routinely produce 3D data sets. Analyzing tortuous structures, such as airways, vessels, ducts or nerves is one of the major applications of these devices. Known methods and apparatus for accomplishing such analysis use multiple oblique slices to analyze local segments of these structures. The multiple oblique slice views provide clear, undistorted pictures of short sections of tortuous structures, but rarely encompass their full length.

Curved reformation images also provide synthetic views of tortuous structures, and advantageously capture the whole length of these objects. Thus, curved reformation images are well suited to analysis of such structures. True 3D length measurements along an axis of a tortuous structure can be obtained from these views, and measurements from these views are sufficiently close to the real anatomy in many cases.

In one known technique, curved reformation images are generated by sampling values along a curve at equidistant points to generate lines, and then translating the curve using a sampling vector to generate the next image line (i.e., along any 2D orientation). By representing the points in a polar coordinate system, with all of the points in the upper two quadrants of the coordinate system, a cubic spline algorithm is applied to a redefined set of points, thereby generating a series of functions that best approximates a desired curve. A conversion is then done to generate screen coordinates for selecting pixel values to display. Also, additional curves equidistant from an original curve are generated to produce additional views of the scanned structure. The calculation of these additional curves also uses a polar coordinate representation of cubic spline coefficients for the initial curve. These coefficients are used to determine intermediate data points at which a uniform length perpendicular is constructed. New data points equidistant from the initial curve are calculated by traversing each perpendicular a desired length.

Such known techniques and systems do not provide interactive adjustments well-suited to the display of tortuous structures. For example, in some known implementations, a curve is translated interactively but artifacts are created in the case of tortuous structures because the sampling curve may be outside of the object. These artifacts look like pseudo-stenoses.

To display some features, for example, bifurcations, local stenoses, and calcifications, one must manually redefine a sampling vector. This process is time consuming. Also, it is difficult to adjust the display to depict selected features. Also, the display assumes that the target features are known when the sampling vector is selected. Therefore, this known method is not practical for medical review because the possible lesions are not known ahead of time.

It would therefore be desirable to provide methods and apparatus for interactively displaying and adjusting the display of tortuous structures.

BRIEF SUMMARY OF THE INVENTION

There is therefore provided, in a one embodiment of the present invention, a method for interactively rotating a sampling surface of a reconstructed computed tomographic (CT) image. The method includes steps of: scanning a volume of a patient to collect a plurality of slices of image data; displaying an image slice including a structure of interest on a display; defining a segmented line approximating a centerline of the structure of interest; selecting a rotation vector, a reference vector, and an angle; generating a sampling vector as a function of the rotation vector, the reference vector, and the selected angle; and generating a curved reformation image from the plurality of slices of image data using the segmented line and the sampling vector.

Embodiments of the present invention provide efficient interactive adjustments well suited to the display of tortuous structures. Embodiments of the present invention also do not require that the target features be known when a sampling vector is selected. Thus, such embodiments are practical for medical review when possible lesions are not known ahead of time.

DETAILED DESCRIPTION OF THE INVENTION

Figure 1:
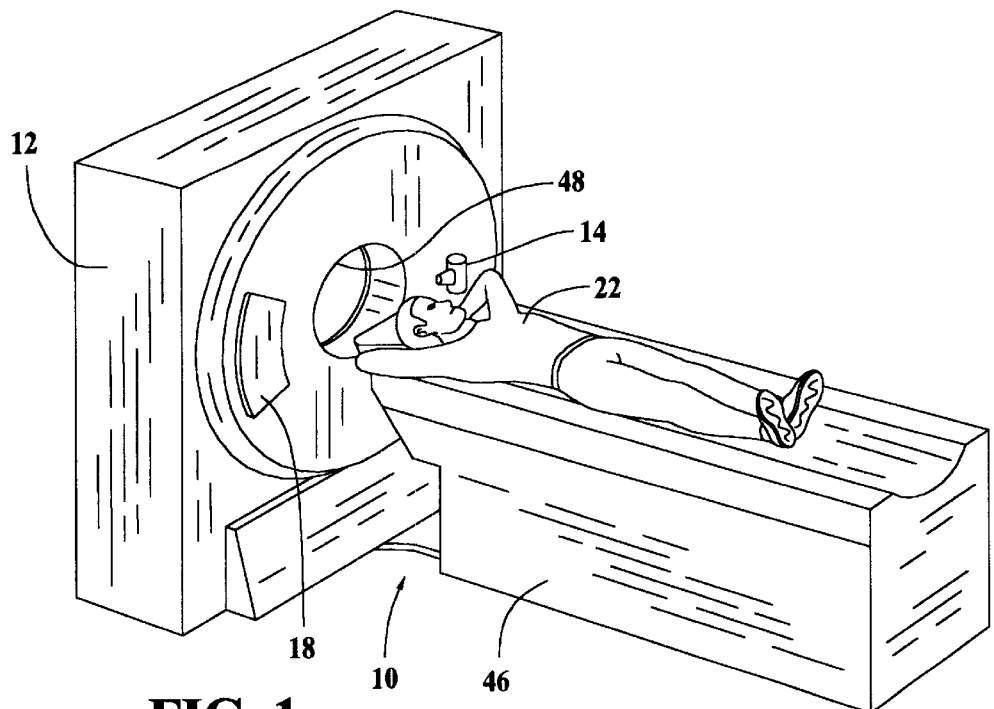
FIG. 1 is a pictorial view of a CT imaging system.
Figure 2:
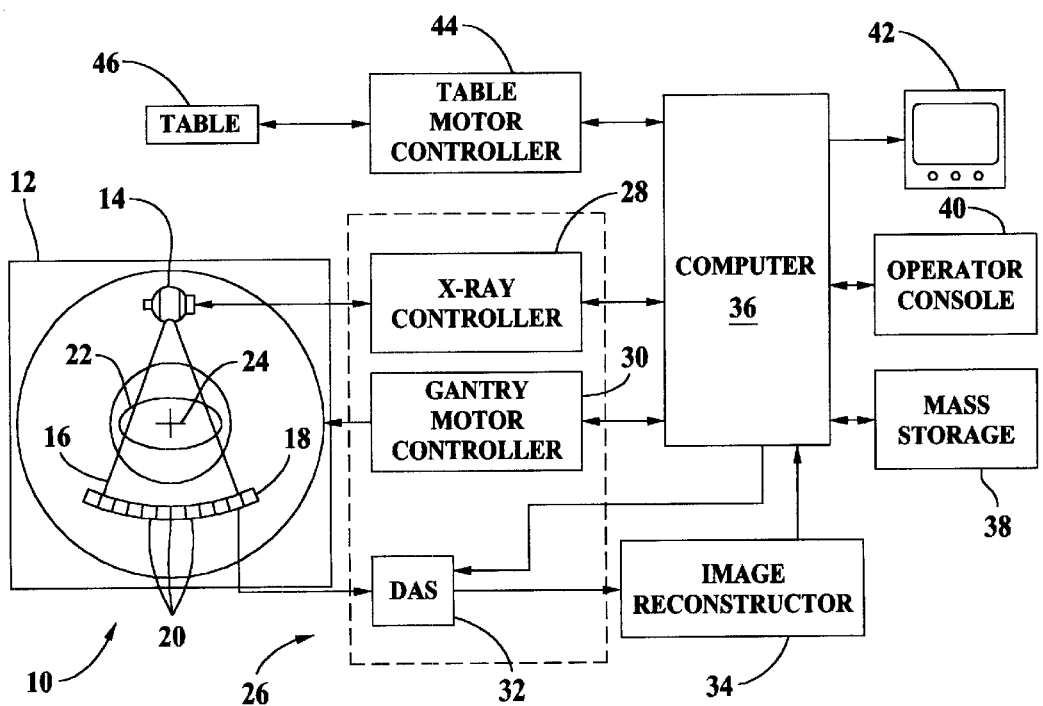
FIG. 2 is a block schematic diagram of the system illustrated in FIG. 1.

Referring to FIGS. 1 and 2, a computed tomography (CT) imaging system 10 is shown as including a gantry 12 representative of a "third generation" CT scanner. Gantry 12 has an x-ray source 14 that projects a beam of x-rays 16 toward a detector array 18 on the opposite side of gantry 12. Detector array 18 is formed by detector elements 20 which together sense the projected x-rays that pass through an object, such as a medical patient 22. Each detector element 20 produces an electrical signal that represents the intensity of an impinging x-ray beam and hence the attenuation of the beam as it passes through object or patient 22. During a scan to acquire x-ray projection data, gantry 12 and the components mounted thereon rotate about a center of rotation 24. In one embodiment, and as shown in FIG. 2, detector elements 20 are arranged in one row so that projection data corresponding to a single image slice is acquired during a scan. In another embodiment, detector elements 20 are arranged in a plurality of parallel rows, so that projection data corresponding to a plurality of parallel slices can be acquired simultaneously during a scan.

Rotation of gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized x-ray data from DAS 32 and performs high speed image reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 in gantry 12. Particularly, table 46 moves portions of patient 22 through gantry opening 48.

One embodiment of the present invention makes use of software or firmware running on computer 36 along with console 40 and display 42 to interactively rotate a sampling surface so as to quickly display relevant images in a limited amount of time. A mouse or other pointing device (not shown) can also be provided to facilitate entry of data and/or image locations. A full volumetric analysis of a portion of patient 22 can thus be performed in a user-friendly way. Other embodiments utilize a general purpose computer or workstation having a memory (i.e., short-term or long-term storage) and/or printing capability for storing or printing images. Suitable memory devices are well known and include, but are not limited to, RAM, diskettes, hard drives and optical media. Embodiments using such stand-alone computers or workstations receive data from which images are reconstructed from CT imaging system 10 via conventional electronic storage media (not shown) or via a conventional communication link (not shown).

Figure 3:
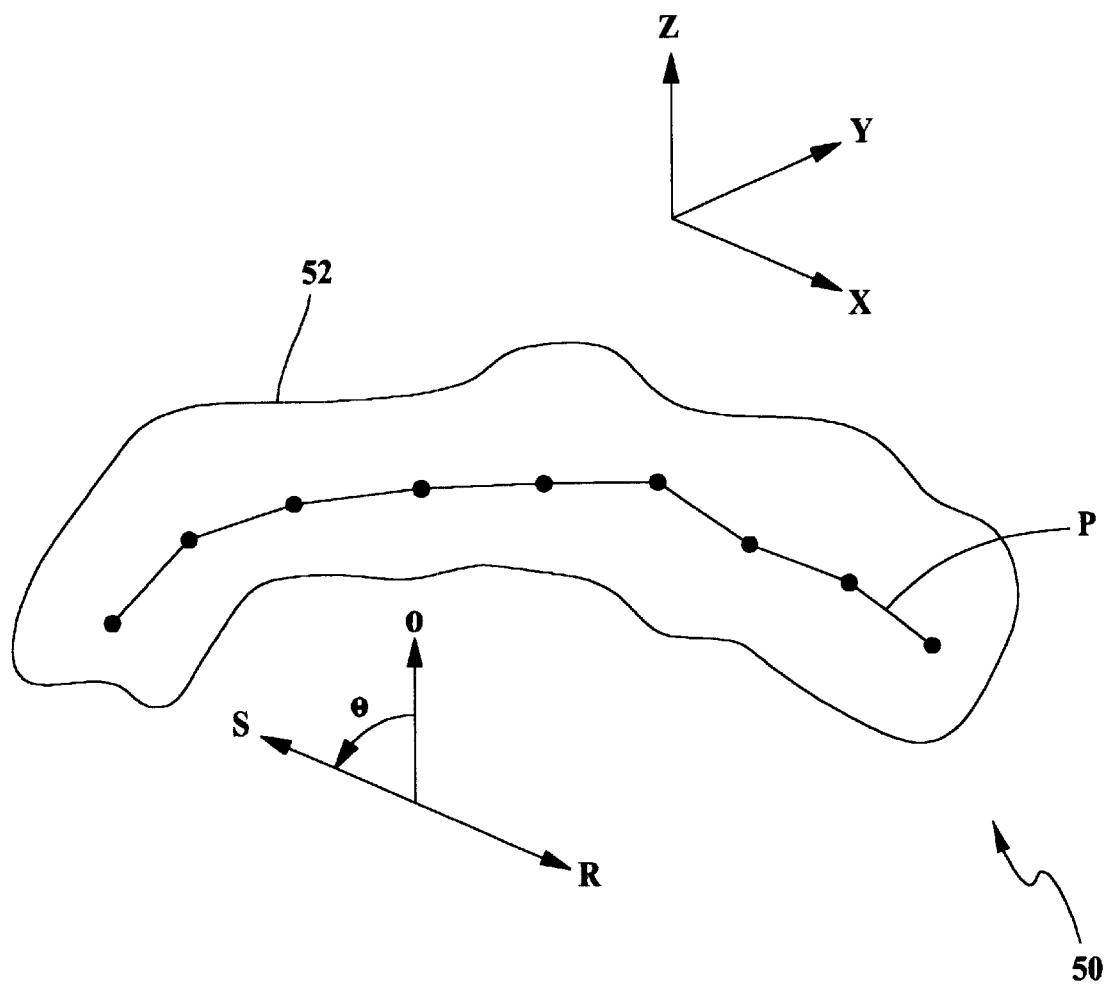
FIG. 3 is a representation of a displayed image, showing a segmented line approximating a centerline of a structure of interest and a set of axes or vectors from which a curved reconstructed image is generated.

In one embodiment of the present invention, a scan is performed on a volume of patient 22, resulting in the collection of a plurality of slices of image data. Referring to FIG. 3, one image 50 is selected for display on display 42. A segmented line P is then defined that approximates a centerline of a structure of interest 52. This definition is performed, for example, by using automated methods that track the centerline or by using data manually input by a user. For example, manual input is obtained by drawing on any view of a volume containing the structure of interest with a mouse or other pointing device.

A rotation axis or vector R is also defined. In one embodiment, the rotation axis is arbitrary. In another, a coordinate vector (X, Y or Z) that is closest to the general orientation of the structure of interest is used to provide more intuitive control. In another embodiment, a rotation axis or vector R is defined from an orientation of the segmented line P. Any other axis may be used.

Next, a reference axis or vector O is defined. In one embodiment, the axis is orthogonal to R, for example, another vector from {X, Y, Z} or a vector related to an anatomical feature. An example of a vector related to an anatomical feature is a projection of the axis of a branch from the structure of interest onto a plane that is defined by R. In one embodiment, rotation vector R and reference axis or vector O are both selected to be closest to a plane that provides highest image resolution.

An angle $\theta$ is then defined, for example by using input from the user or by automatic generation in a sequential loop. A new sampling vector S is created by rotating O around R by $\theta$. In one embodiment, a new sampling vector S is generated for each execution of the sequential loop.

Figure 4:
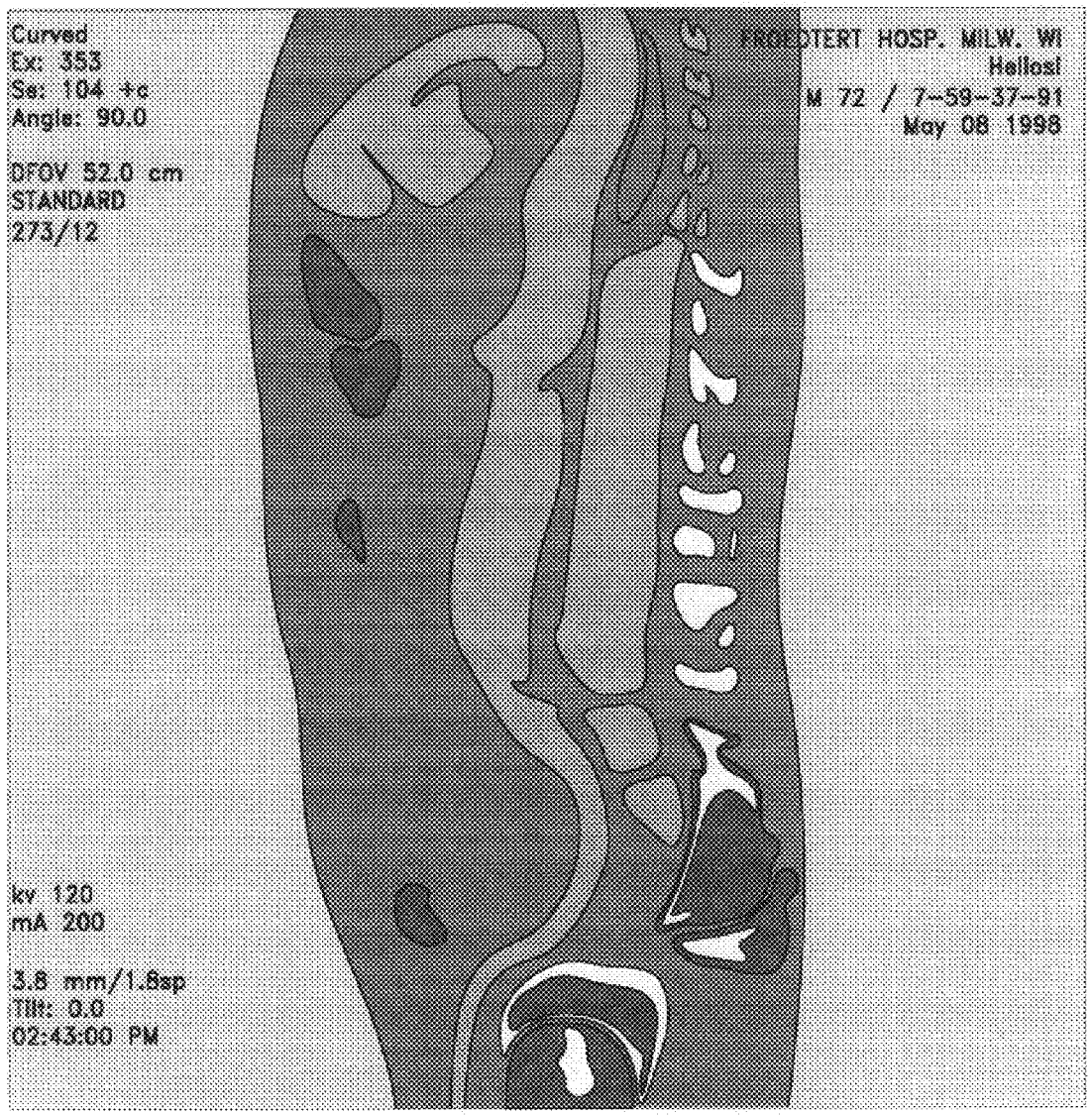
FIG. 4 is a curved reconstructed image of a torso of a patient with a selected angle of 90 degrees.
Figure 4:
Figure 5:
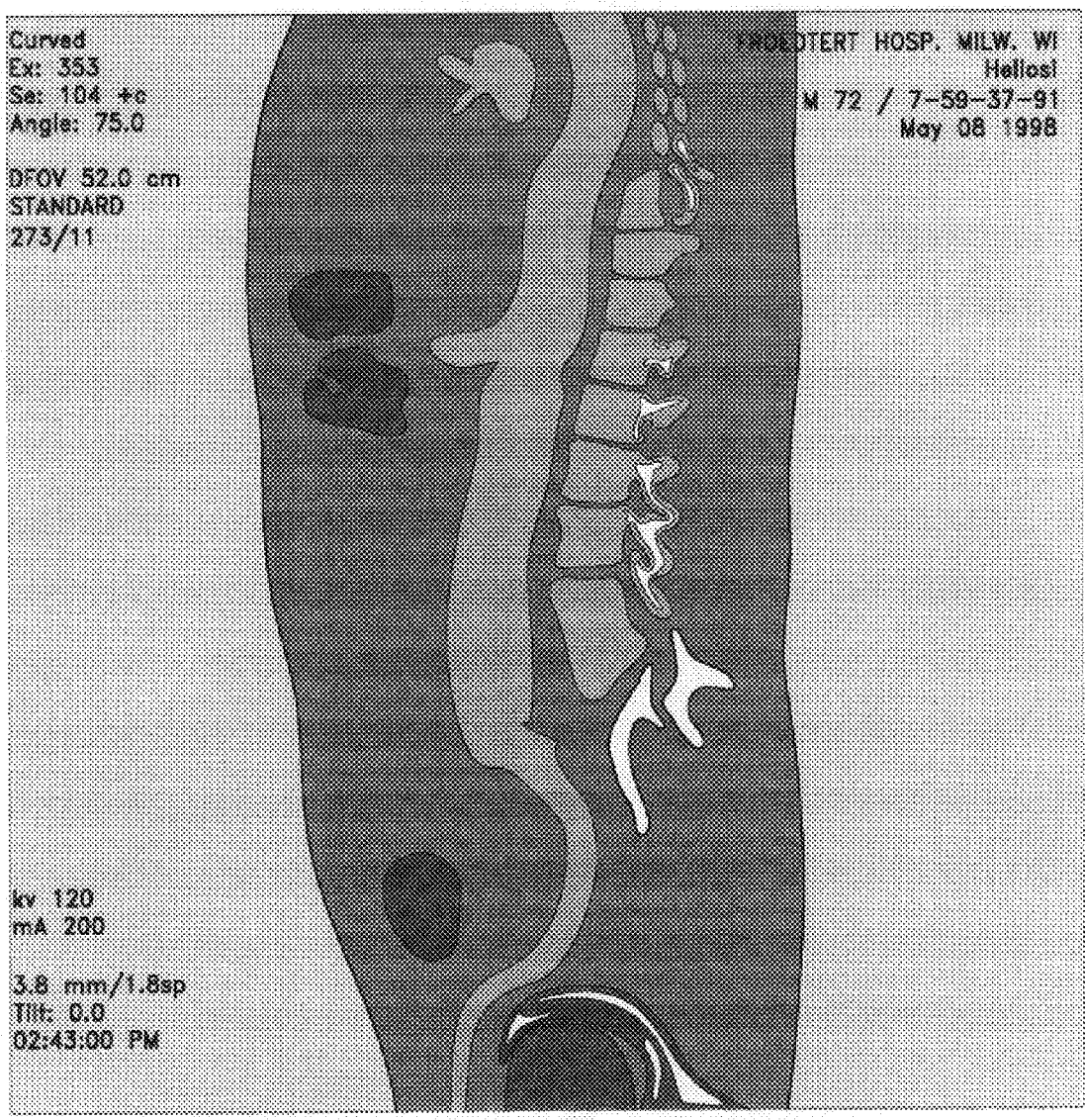
FIG. 5 is a curved reconstructed image of a torso of a patient with a selected angle of 75 degrees.
Figure 6:
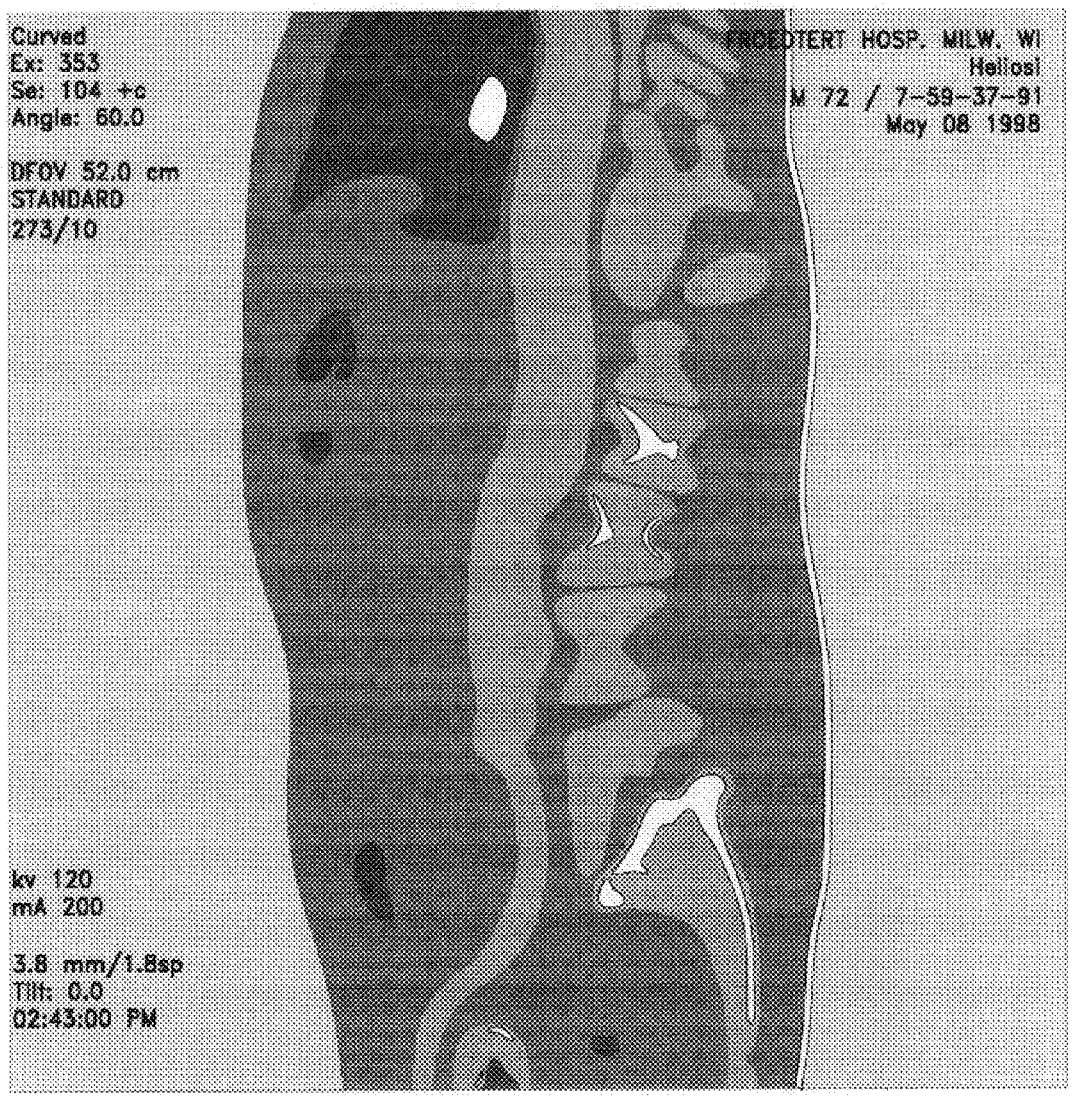
FIG. 6 is a curved reconstructed image of a torso of a patient with a selected angle of 60 degrees.

In one embodiment and referring to FIG. 4, a curved reformation image 54 is then generated, as defined by P and S, with all other parameters remaining the same. In one embodiment, and referring to FIGS. 5 and 6, additional curved reformation images such as 56 and 58 are generated. One or more images 54 are saved, for example, to long-term storage, short-term storage, and/or film or paper.

Embodiments of the present invention, including those described in detail herein, provide efficient interactive adjustments well suited to the display of tortuous structures. In at least one embodiment, sampling vectors do not have to be manually redefined, thus saving time compared to known methods that require manual redefinition of sampling vectors. In addition, embodiments of the present invention do not require that the target features be known when a sampling vector is selected. Thus, such embodiments are practical for medical review when possible lesions are not known ahead of time.

While the invention has been described in terms of various specific embodiments, those skilled in the art will recognize that the invention can be practiced with modification within the spirit and scope of the claims.

What is claimed is:

1. A method for interactively rotating a sampling surface of a reconstructed computed tomographic (CT) image comprising the steps of:

scanning a volume of a patient to collect a plurality of slices of image data;

displaying an image slice including a structure of interest on a display;

defining a segmented line approximating a centerline of the structure of interest;

selecting a rotation vector, a reference vector, and an angle;

generating a sampling vector as a function of the rotation vector, the reference vector, and the selected angle; and generating a curved reformation image from the plurality of slices of image data using the segmented line and the sampling vector.

2. A method in accordance with claim 1 wherein said step of defining a segmented line comprises the step of using a centerline tracking algorithm to generate the segmented line.

3. A method in accordance with claim 2 further comprising the steps of generating a plurality of angles in a sequential loop, generating sampling vectors for each of the plurality of angles, and generating a curved reconstruction image corresponding to each of the sampling vectors.

4. A method in accordance with claim 1 wherein said step of selecting a reference vector comprises selecting a reference vector as a projection of an axis of a feature of the object of interest on a plane defined by the rotation vector.

5. A method in accordance with claim 1 wherein said step of selecting a rotation vector comprises selecting the rotation vector as a function of an orientation of the segmented line.

6. A method in accordance with claim 1 wherein said step of selecting the rotation vector and the reference vector comprises selecting a rotation vector and a reference vector closest to a plane providing highest imaging resolution.

7. A method in accordance with claim 1 further comprising the steps of generating a plurality of angles in a sequential loop, generating sampling vectors for each of the plurality of angles, and generating a curved reconstruction image corresponding to each of the sampling vectors.

8. A method in accordance with claim 7 further comprising the step of saving at least one said curved reconstruction image to a storage medium.

9. A method in accordance with claim 8 wherein the storage medium comprises film.

10. A system for interactively rotating a sampling surface of a reconstructed computed tomographic (CT) image, said system configured to:

display an image slice on a display, said image slice selected from a plurality of slices of computed tomographic image data and including a structure of interest;

define a segmented line approximating a centerline of said structure of interest;

select a rotation vector, a reference vector, and an angle;

generate a sampling vector as a function of said rotation vector, said reference vector, and said selected angle; and generate a curved reformation image from said plurality of slices of image data using said segmented line and said sampling vector.

11. A system in accordance with claim 10 wherein to define said segmented line, said system is configured to use a centerline tracking algorithm to generate said segmented line.

12. A system in accordance with claim 11 further configured to generate a plurality of angles in a sequential loop, generate sampling vectors for each of said plurality of angles, and generate a curved reconstruction image corresponding to each of said sampling vectors.

13. A system in accordance with claim 10 wherein to select said reference vector, said system is configured to select a reference vector as a projection of an axis of a feature of the object of interest on a plane defined by said rotation vector.

14. A system in accordance with claim 10 wherein to select said rotation vector, said system is configured to select said rotation vector as a function of an orientation of said segmented line.

15. A system in accordance with claim 10 wherein to select said rotation vector and said reference vector, said system is configured to select a rotation vector and a reference vector closest to a plane providing highest imaging resolution.

16. A system in accordance with claim 10 further configured to generate a plurality of angles in a sequential loop, generate sampling vectors for each of said plurality of angles, and generate a curved reconstruction image corresponding to each of said sampling vectors.

17. A system in accordance with claim 16 further configured to save at least one said curved reconstruction image to a storage medium.

18. A system in accordance with claim 17 wherein said storage medium comprises film.

19. A system in accordance with claim 10 further configured to scan a volume of a patient to collect said plurality of slices of image data.

20. A system in accordance with claim 10 configured to receive said plurality of slices of image data from via at least one member of the group consisting of electronic storage media and communication links.

* * * * *